United States Patent
Kumar

(10) Patent No.: US 6,693,979 B1
(45) Date of Patent: Feb. 17, 2004

(54) ADAPTIVE SMOOTHING SYSTEM FOR FADING COMMUNICATION CHANNELS

(75) Inventor: Rajendra Kumar, Cerritos, CA (US)

(73) Assignee: The Aerospace Corporation, El Segundo, CA (US)

(*) Notice: Subject to any disclaimer, the term of this patent is extended or adjusted under 35 U.S.C. 154(b) by 0 days.

(21) Appl. No.: 09/482,295

(22) Filed: Jan. 13, 2000

(51) Int. Cl.$^7$ ............................................... H04L 27/06
(52) U.S. Cl. ........................................ 375/326; 375/344
(58) Field of Search ................................. 375/326, 344, 375/231; 342/344, 195

(56) References Cited

U.S. PATENT DOCUMENTS

| | | | | |
|---|---|---|---|---|
| 4,807,256 A | * | 2/1989 | Holmes et al. | 375/344 |
| 5,140,615 A | * | 8/1992 | Jasper et al. | 375/347 |
| 5,604,768 A | * | 2/1997 | Fulton | 375/220 |
| 5,875,215 A | * | 2/1999 | Dobrica | 375/344 |
| 5,956,098 A | * | 9/1999 | Mizukami et al. | 348/735 |

* cited by examiner

Primary Examiner—Stephen Chin
Assistant Examiner—Lawrence Williams
(74) Attorney, Agent, or Firm—Derrick Michael Reid

(57) ABSTRACT

An adaptive smoother includes a phase lock loop, a scintillation amplitude estimator and a fixed delay smoother operating on amplitude estimates for providing improved phase and/or code delay estimates of coherently modulated signals in the presence of dynamic phase process and time varying amplitudes. The adaptive smoother can be applied to GPS communication signals that are subject to fading due to small-scale temporal and spatial variations in ionospheric electron density. The adaptive smoother in a communication or navigation receiver results in improved signal tracking and navigation solutions.

15 Claims, 1 Drawing Sheet

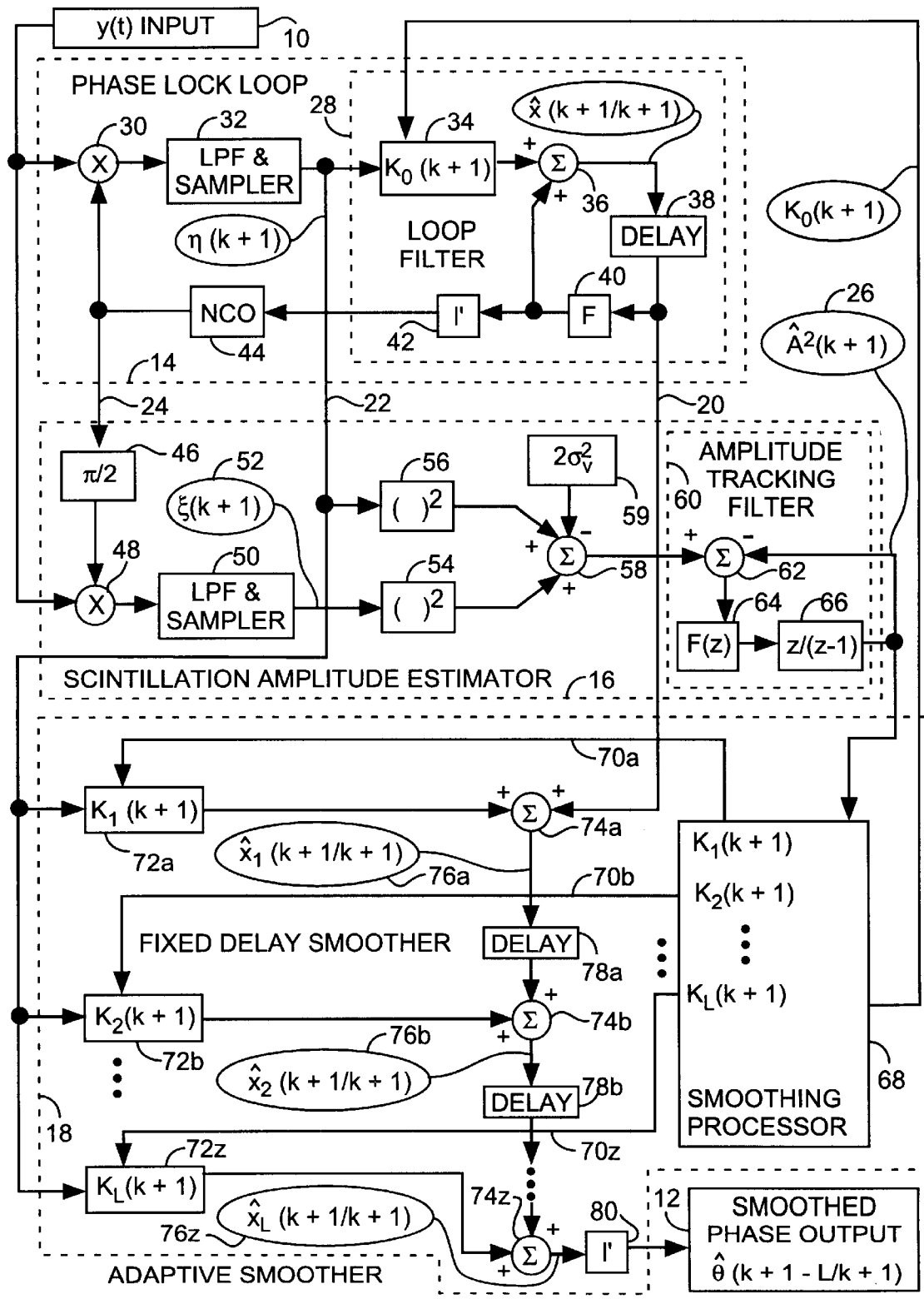

ADAPTIVE SMOOTHING SYSTEM FOR FADING COMMUNICATION CHANNELS

STATEMENT OF GOVERNMENT INTEREST

The invention was made with Government support under contract No. F04701-93-C-0094 by the Department of the Air Force. The Government has certain rights in the invention.

FIELD OF THE INVENTION

The present invention relates to the carrier and code tracking in the presence of signal fading. Specifically, an adaptive smoother is used to compensate for signal fading arising for example due to ionospheric scintillation in the propagation of GPS signals.

BACKGROUND OF THE INVENTION

The Global Positioning System (GPS) relies upon GPS signals transmitted through the ionosphere between orbiting GPS satellite transmitters and ground based receivers that acquire and lock onto the GPS signals. As the GPS signals traverse the ionosphere, scattering of energy takes place due to irregularities in the ionosphere, primarily at altitudes at 300–400 Km. Small-scale variations in ionospheric electron density result in rapid variations in the amplitude and phase of the received GPS signal, known as scintillation. Scintillation effects get more severe during times of peak solar activity. Possible effects of this scintillation phenomenon on the overall performance of GPS navigation will appear as degraded measurement accuracy obtained by the GPS receiver and by the reference receivers in case of wide area augmentation systems, (WAAS). In terms of scintillation activity, the regions of greatest concern for most GPS users include polar latitudes, auroral latitudes during severe magnetic storms, and equatorial regions during years of high solar flux and extending approximately 30° either side of the geomagnetic equator. The regions of severest ionospheric activity are concentrated within 10° wide bands centered about 15° either side of the geomagnetic equator. In these regions, GPS L-band signals from beacon satellites have been observed to fade by up to 30 dB. These periods of fade can last for several hours with period of no fading in between. During intense ionospheric conditions, the GPS signals suffer simultaneously from amplitude fading and rapid phase changes causing performance degradation of the tracking loop of the GPS receiver.

Ionospheric physical modeling has included diffraction models from isolated irregularities, perturbation models of approximation, and the phase screen models. These models have been used for the purpose of evaluating the impact of amplitude and phase scintillation on the GPS receiver. The results show that under Rayleigh fading conditions representing strong scintillation, there is a performance degradation of up to about 6–7 dB due to amplitude scintillation. Tracking Phase lock loops (PLL) have numerically controlled oscillators (NCO) for phase tracking but do not follow amplitude variations. Current tracking loop designs do not solve the problem of amplitude scintillation. Kalman filter based phase lock loops have been used for phase estimation in combination with fixed delay phase smoothers. In a fixed delay phase smoother, the amplitude A(k) is either assumed known for all time k or is assumed equal to a known constant. Alternatively, a Kalman filter based phase lock loop is used in combination with a first order amplitude estimator for unknown amplitudes for improved phase estimation. Existing low pass filters have been designed to sufficiently estimate the average signal power to determine the signal to noise power ratios (SNR) but are inadequate for following the instantaneous amplitude variations caused by scintillation. In GPS receivers, the SNR is not determinative, but rather, the accuracy of the phase estimation is important.

In the presence of phase scintillation, the GPS receiver will track the composite dynamic phase process comprising relative dynamics of the GPS satellite and receiver, any receiver reference oscillator noise and the scintillation phase dynamics. The increased phase dynamics due to the ionospheric scintillation will result in increased tracking errors, cycle slips or possibly loss of lock. For this case, a multistage estimator structure disclosed in U.S. Pat. No. 5,019,824, by Dr. R. Kumar, entitled "Multistage Estimation of Received Carrier Signal Under Very High Dynamic Conditions of the Receiver," issued on May 28, 1991 can be applied. This architecture comprises more than one estimation stage wherein the succeeding estimation stages process the error signals generated by the preceding stages to provide an overall estimate that is better than can be obtained by a traditional single stage estimator under certain conditions. A two-stage specialization of the multistage estimator of the Kumar patent has been proposed to solve the problem of estimation in the presence of phase scintillation. Simulation examples show that a second estimation stage results in improvement of the tracking error by about 6.5 dB over the single stage estimator. While the multistage estimator can be applied to the problem of phase scintillation, it does not provide a solution to the degradation caused by the amplitude scintillation.

The scintillation effects appear as degraded tracking accuracy and may also cause receiver loss of lock and longer acquisition times. Simulation results show that the slower the amplitude fading is compared to the tracking loop bandwidth, the more is the performance degradation. Because the fade rate is expected to be relatively slow at the operating GPS frequencies, the simulation results show the significance of ionospheric scintillation on the GPS signals especially under solar max conditions and in the equatorial and polar regions wherein the GPS signals may experience deep fades. Such fades may result in disruption of GPS service especially to some safety critical applications such as GPS based aviation including aircraft precision approach and landing. Amplitude scintillation degrades the tracking performance through large coherent phase errors and code tracking errors in communication and navigation receivers. Ionospheric scintillation causes amplitude variations of received signals that result(s) in phase estimator errors or code tracking errors. These and other disadvantages are solved or reduced using the invention.

SUMMARY OF THE INVENTION

An object of the present invention is to improve receiver performance in the presence of amplitude scintillation of a transmitted signal.

Another object of the invention is to provide real-time estimation of the scintillation amplitude.

Yet another object of the invention is to provide an adaptive smoother for improved carrier phase estimations in the presence of varying scintillation amplitudes Still another object of the invention is to provide an adaptive smoother having a Kalman filter based phase lock loop for phase estimations, in combination with a high order amplitude estimator for providing rapidly varying dynamic amplitude variations, and in combination with a fixed delay phase smoother for improved phase estimation.

The present invention is an adaptive smoother for solving the problem of coherent receiver performance degradation in the presence of amplitude variations, such as those caused by ionospheric amplitude scintillation typically experienced by the communication or navigation signals, such as GPS signals, resulting in deep signal fades. The adaptive smoother provides real-time estimations of the scintillation amplitude and the resulting phase estimations with reduced phase estimation errors. The adaptive smoother is capable of tracking amplitude variations under realistic channel fade rates. As the impact of amplitude fluctuations is most dominant under relatively slow, but deep fades, the adaptive smoother provides improved estimates of the amplitude scintillation process and the received signal phase. The adaptive smoother is integrated into a receiver tracking loop. The tracking loop is made adaptive by including the effects of amplitude variations estimated from a high order scintillation amplitude estimator. When the tracking loop is made adaptive, the tracking performance is improved by 1–1.5 dB. The more significant improvement is achieved by making the fixed delay smoother adaptive by including the effects of amplitude variations estimated from the high order scintillation amplitude estimator. The scintillation amplitude estimator is used for providing a time varying amplitude estimation for adaptive operation for both the tracking loop and the fixed delay smoother for optimum phase smoothing for improved receiver performance by offsetting the impact of amplitude scintillation. Simulations show that the performance improvement with adaptive smoother comprising the phase lock loop, the fixed delay smoother and the scintillation amplitude estimator results in an improvement of 6–8 dB. The overall performance of adaptive smoother in the presence of amplitude fading is significantly improved as compared to an optimum Kalman filter. In the simulation examples, the adaptive smoother compensates for any loss in tracking performance due to amplitude fading.

The adaptive smoother includes the tracking loop, the scintillation amplitude estimator, and the fixed delay smoother. The adaptive smoother uses the Kalman filter based phase lock loop for phase estimations, in combination with the high order scintillation amplitude estimator for varying amplitude estimation in the presence of rapidly varying dynamic amplitude variations, and in combination with the fixed delay phase smoother for improved phase estimation. The scintillation amplitude estimator consists of a noisy amplitude estimator based on a single sample, followed by an amplitude tracking filter. The amplitude tracking filter uses a phase lock tracking loop (PLL) structure including filtering and integration functions without a numerically controlled oscillator (NCO). The scintillation amplitude estimator is capable of tracking the amplitude variations under realistic channel fade rates. As the impact of amplitude fluctuations is most dominant under relatively slow but deep fades, the amplitude estimator can provide an accurate and instantaneous estimate of the amplitude scintillation process. When the tracking loop is made adaptive with respect to the amplitude variations, simulations show that the tracking performance is improved by 1–1.5 dB. While this is a significant improvement, additional improvement is possible when the fixed delayed phase smoother is also made adaptive by processing the effects of amplitude variations. Simulations show that the performance improvement with an adaptive fixed delay phase smoother generating gain vectors with amplitude adaptation results in an improvement of 6–8 dB in tracking errors. Thus, both tracking loop and phase smoother amplitude variation adaptations are important aspects in improving the receiver performance and offsetting any impact of amplitude scintillation.

The GPS signal is code and data demodulated by conventional demodulators to provide the adaptive smoother with a carrier input signal having variable amplitude and phase. The adaptive smoother provides the final smoothed phase output to the code and data demodulator and to a navigation processor, in the case of GPS receiver computing final navigation position solutions. The fixed delay smoother introduces a delay between the smoothed phase output and the input signal during the fixed delay smoother operation. Because the fixed delay smoother delay is a small fraction of a second, the fixed delay smoother delay can be offset in most GPS applications by predicting the position estimate over the fixed delay smoother delay interval when computing the final navigation position solution. In most applications, any degradation due to such position prediction will be negligible.

The adaptive smoother applies high order amplitude estimations for dynamic amplitude variations in combination with phase estimations and smoothing for providing an improved smoothed phase output. Dynamic amplitude estimations and phase smoothing provide improved accuracy in phase estimation in the presence of high variation of scintillation amplitude variations to ameliorate the effects of amplitude fading due to ionospheric scintillation. The adaptive smoother provides a solution to the problem of high phase estimation errors resulting from scintillation amplitude variations. The improvement is stated in terms of phase accuracy, not SNR, and the 6–8 dB improvement is in terms of root mean square (RMS) phase errors. The SNR and phase errors are used to estimate the impact of scintillation amplitude variations and to verify the improvement of the adaptive smoother. Such improvement applies to a wide range of SNR conditions. The system provides 5–7 dB improvement both in terms of carrier phase and code delay tracking error variances. In GPS applications tracking error in code delay and/or carrier phase directly translates to range tracking error, to provide up to 5–7 dB improvement in terms of navigation error. These and other advantages will become more apparent from the following detailed description of the preferred embodiment.

BRIEF DESCRIPTION OF THE DRAWING

The drawing is a block diagram of an adaptive smoother.

DETAILED DESCRIPTION OF THE PREFERRED EMBODIMENT

An embodiment of the invention is described with reference to the drawing using reference designations as shown in the drawing. The adaptive smoother is preferably used in a communications or navigation receiver for providing phase estimation of a received signal. The adaptive smoother is used for receiving an input signal y(t) 10 and for providing a smoothed phase estimate output 12. The input signal 10 may be, for example, a GPS signal that is code and data demodulated and down converted to an intermediate frequency (IF). The adaptive smoother includes a phase lock loop (PLL) 14, a scintillation amplitude estimator 16 and a fixed delay smoother 18. The phase lock loop 14 provides a filtered state estimate 20, an inphase prediction error 22 and an oscillator reference signal 24. The scintillation amplitude estimator 16 receives the input signal 10, the oscillator reference 24, and the inphase prediction error 22, and provides a final amplitude estimate 26 to the fixed delay smoother 18, that is thereby made adaptive to amplitude variations. The fixed delay smoother 18 also receives the filtered state estimate 20 and the inphase prediction error signal 22 and then adaptively provides the smoothed phase output 12 based on the amplitude variations.

The phase lock loop 14 provides the estimate of the input signal phase at time k on the basis of input signal up to time k. The phase lock loop 14 is preferably based on Kalman filtering. However, at the cost of possible loss in performance, the phase lock loop 14 may be based on other conventional design approaches. For good tracking performance of the PLL 14, it is required that the input signal amplitude be a known or accurately estimated. In the presence of communications or navigation signals communicated over fading channels as exemplified by the ionospheric scintillation, the amplitude is varying in a random manner, and the actual variation is dictated by the complex temporal and spatial random fluctuations of the ionospheric electron density, rendering the amplitude unknown over all time. For improved tracking performance of the PLL 14, a time-varying amplitude estimate of the amplitude A(k), that is, the final amplitude estimate from the amplitude estimator 16 is used to render the PLL 14 adaptive. A Kalman filter gain vector $K_0(k+1)$ is received by the PLL 14, and is dependent on A(K) and is computed by recursive equations for Kalman vector gain equations that are subsumed in the fixed delay smoother 18. The phase lock loop 14 is made adaptive by using the $K_0$ gain vector that is derived from the amplitude estimate A(k). Even with amplitude estimation or with (a) known amplitude, the performance of PLL 14, although improved, can be very significantly degraded due to frequent signal degradation caused by fading. In order to further improve performance, a fixed delay is introduced between the phase of the input signal 10 and the final smoothed phase estimate output 12 of the phase of the input signal 10 in the fixed delay smoother 18 which results in significant performance improvement at the cost of a small estimation delay. Hence, the PLL 14 and the fixed delay smoother are both made adaptive based on estimates of the amplitude A(k) provided by the scintillation amplitude estimator 16, but with an inherent fixed delay in the fixed delay smoother 18.

The phase lock loop 14 comprises an inphase mixer 30 for down converting the input signal 10 into an inphase baseband signal, and an inphase low pass filter-sampler 32 for providing the inphase prediction error signal 22 at baseband. The mixer 30 multiplies the input signal 10 by the oscillator reference signal 24 for down converting the input signal 10 to baseband and low pass filter-sampler filters and samples the inphase baseband signal for generating the inphase prediction error signal 22. The phase lock loop 14 also includes a loop filter 28 for providing the filtered state estimate signal 20. The inphase prediction error signal 22 is communicated to the loop filter 28. The loop filter 28 functions to convert the down converted sampled baseband inphase prediction error signal 22 into the filtered state estimate signal 20 and to provide a first selected component signal of the filtered state estimate signal 20 for adjusting oscillator reference signal 24 to minimize the inphase prediction error. The loop filter 28 includes the vector multiplier 34 that multiplies the inphase prediction error signal 22 by a $K_0(k+1)$ gain vector. The $K_0(k+1)$ gain vector is provided by the fixed delay smoother 18 and is derived from the final amplitude estimate 26, and thereby renders the loop filter 28 as well as the phase lock loop 14 adaptive with respective amplitude estimations. The multiplier 34 provides a multiplied vector signal to a loop vector summer 36 that provides a 0th smoothed state estimate that is a state estimate that is passed through a 0th delay 38 to provide the filtered state estimate signal 20. The filtered state estimate signal 20 is also further communicated to an F matrix multiplier 40 providing a state vector signal to the summer 36 and to a vector component selector 42. The vector component selector 42 selects the first signal component of the state vector signal from the F matrix multiplier 40 as an error correction signal then communicated to a numerically controlled oscillator (NCO) 44 that adjusts the coherent carrier reference oscillator signal 24 to reduce the inphase prediction error.

The combination of the inphase mixer 30 and the low pass filter-sampler 32 provide the inphase prediction error signal 22 that includes a signal component and a noise component. The signal component is proportional to a sinusoidal function of the phase prediction error with the constant of proportionality equal to the amplitude of the input signal 10. The phase prediction error is equal to the phase difference θ between the phase of the input signal y(t) and the phase of the NCO 44 output signal plus π/2 radians. For small values of the phase difference θ, the sinusoidal function of θ is approximately equal to θ. During input signal tracking, the phase prediction error θ is small, and hence, the phase prediction error signal 22 is small, and is approximately proportional to the phase prediction error θ. This phase prediction error signal 22 is fed back to the NCO 44 through the loop filter 28. The phase of the reference signal of the NCO 24 is made equal to the phase of the output of the loop filter 28 at the preceding instance of time. Thus, generally a positive phase prediction error signal 22 results in the increase of the phase of the output signal of the NCO 24 so that the phase of the output of the NCO 24 approaches the phase of the input signal 10. Similarly, a negative phase prediction error signal 22 results in decrease of the phase of the output signal of the NCO 24 so that the phase of the output signal of the NCO 24 also approaches the phase of the input signal 10, under close loop control. The function of loop filter 28 is to match the dynamics of the NCO signal phase with the dynamics of the phase of the input signal so that the phase prediction error remains small for all times, for improved performance.

Design of loop filter 28 is based on Kalman filtering theory to assure that the variance of phase prediction error is minimum for the specified input signal phase dynamics specified by the F matrix multiplier 40. The loop filter 28 generates the filtered state estimate 20 that is the estimate of a state vector comprising the input signal phase and time derivatives of the input signal phase. The filtered state estimate 20 is derived by a recursive structure comprising the vector multiplier 34, vector summer 36, delay 38 and the F matrix multiplier 40. The vector component selector 42 selects the first component of the predicted state estimate at the F matrix multiplier 40 output and is the predicted input signal phase estimate communicated to control the NCO 24 for adjusting the oscillator reference 24.

The scintillation amplitude estimator 16 receives the input signal 10, the oscillator signal 24, the inphase prediction error signal 22 to provide an amplitude estimate signal 26 communicated to the fixed delay smoother 18. The input amplitude A(k) of the input signal 10 is used to derive the final amplitude estimate 26 in the scintillation amplitude estimator 16. The scintillation amplitude estimator 16 includes a π/2 phase shifter 46 for phase shifting the oscillator reference signal 24 for down converting the input signal 10 by a quadrature mixer 48 providing a quadrature baseband signal to a quadrature low pass filter-sampler 50. The sampler 50 provides a quadrature prediction error signal to a quadrature square law processor 54 as the sampler 32 provides the inphase prediction error signal 22 to an inphase square law processor 56. The two square law processors 54 and 56 provide respective inphase and quadrature prediction error squared amplitude component signals to an amplitude error summer 58 that also receives a receiver noise variance constant 59 to provide a time varying unbiased sampled amplitude estimate of the input signal 10. The time varying unbiased sampled amplitude estimate from the amplitude error summer 58 is communicated to an amplitude tracking filter 60 that provide the final amplitude estimate 26 communicated to the fixed delay smoother 18. The amplitude tracking filter 60 includes a subtractor 62 providing an unbiased amplitude error signal that is the difference between the unbiased amplitude estimate from the amplitude error summer 58 and the final amplitude estimate 26. The amplitude tracking filter 60 further includes a digital filter 64 and a digital integrator 66 for generating final amplitude estimate signal 26 from the unbiased amplitude error signal from the subtractor 62.

The scintillation amplitude estimator 16 includes a $\pi/2$ phase shifter 46, quadrature mixer 48 and a quadrature low pass filter-sampler 50 for providing a quadrature prediction error 52 that also includes a signal component and a noise component. The signal component of quadrature prediction error 52 is proportional to a cosine function of the phase prediction error with the constant of proportionality equal to the amplitude A(k) of the input signal 10. In the absence of any noise, the sum of the outputs of the square law processors 54 and 56 is equal to $A^2(k)$ and is the square of the amplitude of the input signal 10. In the presence of noise, the output of the amplitude error summer 58 has a bias equal to a receiver noise variance constant $2\sigma_v^2$ 59 and also has a noise component. By subtracting the noise variance constant $2\sigma_v^2$ 59 from the sum of outputs of the square law processors 54 and 56 in the amplitude error summer 58, the output of the summer 58 becomes unbiased and is equal to $A^2$ plus a zero-mean noise value as the time varying unbiased sampled amplitude estimate. The tracking filter 60 reduces the noise in such a manner that the final amplitude estimate 26 has reduced noise and at the same time tracks the time varying amplitude $A^2(k)$ with minimum amplitude tracking error. The actual behavior of the tracking amplitude error will depend upon the dynamics of the amplitude A(k) and the type and order of the amplitude tracking filter 60. Generally, higher order dynamics of $A^2(k)$ requires a higher type and order of the amplitude tracking filter 60 to achieve good tracking performance. The type of the amplitude tracking filter 60 is equal to the number of poles of F( )(z) at z=1 plus 1, and is preferably a type II or higher filter.

The fixed delay smoother 18 receives the final amplitude estimate 26, the inphase sampled signal 22 and the filtered state estimate 20 for computing the final smoothed phase output 12. The fixed delay smoother 18 includes an optimum smoothing processor 68 that receives the final amplitude estimate 26 and provides gain vectors 70a, 70b through 70z where the number z of vector signals equals a constant L. The phase dynamics of the F matrix multiplier 40 in the loop filter 28 influences the generation of the gain vector $K_0(k+1)$ by recursive Kalman filtering used in the smoothing processor 68 that generates the gain vectors $K_0$, $K_1$, through $K_L$, 70ab–z. The gain vectors 70ab–z are loaded into respective vectors multiplier 34, 72a, 72b through 72z that vector multiplies the inphase predictor error signal 22 for providing respective vector correction signals to respective smoothed vector summers 74a, 74b through 74z. The first smoothed vector summer 74a sums the filtered state estimate signal 20 and the respective vector correction signal from the respective multiplier 72a to provide a first smoothed state estimate signal 76a. The signal 76a is delayed by a first smoother delay 78a to provide a first delayed smoothed state estimate signal to the second smoothed vector summer 74b. The second vector summer 74b sums the first delayed smoothed state estimate signal with the second vector correction signal from the multiplier 72b to provide a second smoothed state estimate signal 76b. The second smoothed state estimate signal 76b is delayed by the second smoother delay 78b providing, in turn, a second delayed smoothed state estimate signal communicated to a third smoothed vector summer 74b, not shown, but presented by vertical aligned dots within the drawing, as shown. The vector multiplying, summing and delaying of multipliers 72ab–z, summers 74ab–z, and delays 78ab–z are repeated L times, represented by the vertical aligned dots, where the last summer 74z sums the L–1 delayed smoothed state estimate signal and the last vector correction signal from the multiplier 72z to provide a Lth smoothed state estimate 76z. The Lth smoothed state estimate 76z is then multiplied by smoother vector component selector 80 to provide the final smoothed phase output 12. The final smoothed phase estimate 12 is delayed by an interval equal to the sum of the delays 38 and 74ab–z with respect to the phase of the input signal 10, presenting the fixed delay of the smoothed phase estimate 12.

The estimation of the final smoothed phase output 12 from the fixed delay smoother 18 is an estimation of an extended state vector at time k that is based on the input signal 10 up to time k. The fixed delay smoother 18 is based upon conventional Kalman filtering using an extended state vector model. The extended state vector is a state vector at the present time k denoted x(k) and state vectors at the earlier time instances k–1, k–2, . . . , k–L. The last vector at time k–L in the estimation of the extended state vector is by definition a fixed delay estimate of the state vector x(k). Utilization of the extended state vector model for generating the extended state vector in the smoothing processor 18 results in recursive operations of the fixed delay smoother 18. The recursive equations generate the vector smoother gains $K_i(k+1)$, where i=0, 1, . . . , L.

The drawing shows the adaptive smoother for ameliorating amplitude fading that might be due, for example, to ionospheric scintillation. A GPS received signal has a carrier with a time-varying phase defined by a phase process that is due to relative Doppler shifts between the transmitter and receiver and due to ionospheric scintillation. In the context of a GPS receiver, the received GPS signal is given by a received GPS signal equation.

$$y_i(t) = \sqrt{2} A(t) D(t-\tau) c(t-\tau) \sin(\omega_c t + \theta(t)) + v(t) \quad \text{GPS Signal Equation}$$

In the GPS signal equation, A(t) is the received signal amplitude, c(t) is the GPS code, D(t) is the GPS data, $\tau$ is the propagation delay, v(t) is the observation noise, and $\omega_c$ is the carrier frequency. The phase process $\theta(t)$ models the relative dynamics of the GPS satellite and receiver, the receiver reference oscillator noise, and the phase scintillation process. The propagation delay $\tau$ is typically tracked by an early-late code tracking delay lock loop (DLL), not shown, of a conventional GPS receiver, and c(t) being a known sequence it can be removed by demodulation from the received signal. In a DLL, three reference pseudo random code waveforms are generated termed the early, the prompt, and the late code waveforms. The late waveform is delayed with respect to a prompt waveform by a specified fraction of code chip period while the early waveform is advanced with respect to the prompt waveform by the specified fraction of code chip period. The three reference pseudo random code waveforms modulate the carrier reference signal input from the NCO 44 output to generate the respective early, prompt, and late reference signals. These reference early, prompt, and late reference signals are correlated with the input signal in three different correlators to respectively generate early, prompt, and late correlated outputs. The early and late correlated outputs have a difference for generating a correction signal to adjust the phases of the three code reference waveforms such that the prompt code waveform tracks c(t). The prompt correlated output is the unbiased sampled amplitude estimate. The low rate data D(t) is removed either by a decision directed method or by a squaring operation, as is well known. Therefore, for the purpose of carrier phase tracking, the received signal after being down converted may be written as an input signal equation.

$$y(t) = \sqrt{2} A(t)\sin(\omega_I t + \theta(t)) + \bar{v}(t) \qquad \text{Input Signal Equation}$$

The input signal y(t) is the input signal y(t) 10 to the adaptive smoother after removing by demodulation the code and data by a code lock loop, not shown, using conventional methods. In the equation $\omega_I$ is some selected intermediate frequency and $\bar{v}(t)$ is the noise corresponding to the noise v(t). As the signal processing is performed in discrete time at the sample time k, the input signal is also represented in discrete time by a discrete-time input signal equation.

$$y(k) = \sqrt{2} A(k)\sin(\omega_I t_k + \theta(k)) + \bar{v}(k) \qquad \text{Discrete-Time Input Signal Equation}$$

In the discrete-time input signal equation, $t_k$ is the kth sampling time, $\omega_I$ is the known intermediate frequency, and $\bar{v}(k)$ is the observation noise that is a sampled version of a band limited zero mean white noise process $\bar{v}(t)$ with variance R. The phase process $\theta(k)$, the sampled version of $\theta(t)$ models the relative dynamics of the GPS satellite and receiver, any receiver reference oscillator noise and phase scintillation process. Similarly A(k) models the sampled amplitude scintillation process. The impact of amplitude scintillation on the performance of carrier tracking loop is determined with the phase process $\theta(k)$ modeled by phase process model equations.

$$\theta(k) = l'x(k)$$

$$l' = [1\,0\,0\,\ldots\,0]$$

$$x(k+1) = Fx(k) + w(k)$$

$$E[\bar{v}(k)] = 0$$

$$E[w(k)] = 0$$

$$E[w(k)w^T(k)] = Q$$

$$E[\bar{v}(k)w(j)] = 0 \qquad \text{Phase Process Model Equations}$$

$$F = \begin{bmatrix} 1 & T \\ 0 & 1 \end{bmatrix}$$

$$Q = \begin{bmatrix} T^2/3 & T/2 \\ T/2 & 1 \end{bmatrix} \sigma^2 T^2$$

In the phase process model equations, E denotes the expected value operator, x(k) is the state vector of dimension n, F is an (n×n) matrix 40, l' denotes the transpose of l, and w(k) is zero-mean white Gaussian noise process independent of $\{\bar{v}(k)\}$. The F and Q matrices are given for the case of n=2. In the phase process model equations, T is the sampling period and $\sigma^2$ denotes the variance of second derivative of phase, that is equal to normalized acceleration, of the sampled process with $\sigma^2 = N_a/2T$ where $N_a$ is the one-sided power spectral density of the underlying continuos-time normalized acceleration process. The phase lock loop 14 is designed on the basis of optimum Kalman filtering. In practice, the loop filter 28 may also be designed on the basis of various known methods most of which will be inferior to the Kalman filter based design except the one based on optimum z-domain synthesis.

The NCO 44 reference signal at discrete time k is given by an NCO signal equation.

$$y_0(k) = \sqrt{2}\cos((\omega_I t_k + l^T \hat{x}(k/k-1)) \qquad \text{NCO Signal Equation}$$

In the NCO signal equation, $\hat{x}(k/k-1)$ is the one-step ahead predicted estimate of the state x(k) provided by the loop filter 28. The additive noise $\bar{v}(k)$ in the discrete-time input signal equation may be expressed by an inphase and quadrature noise equation.

$$\bar{v}(k) = \sqrt{2}v_i(k)\sin(\omega_I t_k + \theta(k)) + \sqrt{2}v_q(k)\cos(\omega_I t_k + \theta(k)) \qquad \text{Inphase and Quadrature Noise Equation}$$

In the inphase and quadrature noise equations, $v_i(k)$ and $v_q(k)$ are respectively the inphase and quadrature baseband processes of the input 10. The mixer 30 down convert in the continuous time domain, and the resulting inphase baseband signal is sampled at discrete times k and filtered by samplerfilter 32 to providing the filtered sampled baseband inphase prediction error signal 22. Down converting and Sampling is analytically equivalent to sampling and then down converting. Thus, the sampled version of inphase baseband signal form the mixer 30 at time k is given by an inphase prediction error equation.

$$\eta(k) = 2\{[A(k) + v_i(k)]\sin(\omega_I t_k + \theta(k)) + v_q(k)\cos(\omega_I t_k + \theta(k))\}$$

$$\cos(\omega_I t_k + l^T \hat{x}(k/k-1)) \qquad \text{Inphase Prediction Error Equation}$$

After filtering the $2\omega_I$ term in the inphase prediction error equation by the low pass filter 32 the resulting output is given by the filtered inphase prediction error equation.

$$\eta(k) = A(k)\sin(l^T \tilde{x}(k/k-1)) + v_i(k) \qquad \text{Filtered Inphase Prediction Error Equation}$$

In the filtered inphase prediction error equation, $\tilde{x}(k/k-1) = x(k) - \hat{x}(k/k-1)$ is a one-step ahead prediction error for the state estimate and $\hat{x}(k/k-1)$ is a one-step ahead prediction of the state appearing at the output of F multiplier 40.

The recursive Kalman filter equation generating the filtered state estimate at the output of loop vector summer 36 is given by a Kalman filter equation.

$$\hat{x}_0(k+1/k+1) = F\hat{x}_0(k/k) + K_0(k+1)\eta(k+1) \qquad \text{Kalman Filter Equation}$$

The input signal equations and the phase process model equations combine to form fixed delay smoother equations. The one-step predicted phase estimate at discrete time (k+1) at the output of vector component selector 42 is given by a phase prediction equation.

$$\hat{\theta}(k+1/k) = l^T \hat{x}(k+1/k) = l^T F \hat{x}(k/k) \qquad \text{Phase Prediction Equation}$$

The Kalman filter equation and phase prediction equation describe the operation of the phase lock loop 14 wherein the Kalman filter gain $K_0(k+1)$ is provided by the fixed delay smoother 18.

Similar to the filtered inphase prediction error $\eta(k)$, the quadrature prediction error $\xi(k)$ at time k at the output of low pass filter-sampler 50 may be obtained by a filtered quadrature prediction error equation.

$$\xi(k)=A(k)\cos(l^T\tilde{x}(k/k-1))+v_q(k)$$

Filtered Quadrature Prediction Error Equations

From the filtered inphase and quadrature prediction error equations, the relevant properties of the prediction errors are described by prediction error properties equations.

$$E\{\eta^2(k)+\xi^2(k)\}=A^2(k)+2\sigma_v^2$$

$$\sigma_v^2=E[v_i^2]=E[v_q^2]=R/2$$

Prediction Error Properties Equations

The prediction error properties equations are true because the expected value of the cross product of the terms $\eta(k)$ of the filtered inphase prediction error equation and $\xi(k)$ of the filtered quadrature prediction error equation, is zero due to an assumed independence of the noise sequences $\overline{v}(k)$ and $w(k)$ in the phase process model equations. Therefore, a sampled unbiased amplitude estimate of $A^2(k)$, denoted by $\hat{A}_S^2$, may be expressed by a sampled unbiased amplitude estimate equation.

$$\hat{A}_S^2(k)=\eta^2(k)+\xi^2(k)-2\sigma_v^2$$

Sample Unbiased Amplitude Estimate Equation

The sampled unbiased amplitude estimate $\hat{A}_S^2$ appears at the output of the amplitude error summer 58 and is computed by square law processors 54 and 56 operating on the filtered prediction errors 22 and 52. A filtered estimate of $A^2(k)$ is obtained by an appropriate filtering of $\hat{A}_S^2$ to reduce the effect of noise on the final amplitude estimate 26. In a relatively simple estimation procedure, a first-order filter 60 is used to obtain the filtered estimate modeled by a filtered estimate equation.

$$\hat{A}^2(k)=\lambda_S\hat{A}^2(k-1)+(1-\lambda_S)\hat{A}_S^2(k)$$

Filtered Estimate Equation

In the filtered estimate equation, $\lambda_S$ is in the range of 0 to 1 and determines the filter averaging period. Such a filter 60 is adequate if $A(k)$ does not change rapidly with k. If $A(k)$ has relatively fast dynamics, then a higher order tracking filter may be used. The type and order of the filter 60 are generally determined by the order of dynamics of $A(k)$. The objective of the tracking filter 60 is to closely track the true amplitude $A^2(k)$ while minimizing the noise. For this purpose, a type II or higher tracking filter 60 may be used as modeled by a type II or higher filter equation of the amplitude tracking filter 60.

$$\hat{A}^2(k)=F(z)(1-z^{-1})^{-1}[\hat{A}_S^2(k)-\hat{A}^2(k-1)]$$

Type II or Higher Amplitude Filter Equation

In the type II or higher amplitude filter equation, $F(z)$ is the digital filter 64 that acts on the amplitude prediction error $[\hat{A}_S^2(k)-\hat{A}^2(k-1)]$ and $(1-z^{-1})^-$ is the digital integrator 66. As an example, for the specific case of type II filter, the filter transfer function is evaluated from filter transfer function equations.

Filter Transfer Function Equations $$F(z) = G_1 + \frac{G_2}{1-z^{-1}}$$

$$G_1=rd \quad G_2=rd \quad r=4\zeta^2$$

$$d = \frac{4B_AT}{r+1}$$

In the filter transfer function equations, $B_A$ is the desired loop bandwidth, $\zeta$ is the specified damping coefficient and T is the sampling period. The unbiased and filtered final amplitude estimate 26 of $A^2(k)$ is communicated to the fixed delay smoother 18 that then uses this final amplitude estimate 26 to compute the requisite gain vectors 70*ab–z*. The final amplitude estimate 26 of $A(k)$ is obtained as the square root of the estimate of $A^2(k)$ and is represented by $A(k)$. For the discrete-time input signal and the phase model equations, the smoothing processor operates upon fixed delay smoother equations.

$$\hat{x}_i(k+1/k+1)=\hat{x}_{i-1}(k/k)+K_i(k+1)\eta(k+1)$$

$$x_i(k)=x(k-i); i=0,\ldots,L$$

Fixed Delay Smoother Equations

In the fixed delay smoother equations, $\hat{x}_i(k/j)$ denotes the estimate of $x_i(k)$ on the basis of observations up to time j and the gain vectors $K_i$ and the cross covariance matrices $P_{i0}(k/j)$ are defined by gain and covariance equations. The fixed delay smoother 18 provides the final smoothed phase estimation 12 as an extended state vector at time k based on the input signal observation up to time k using Kalman filtering. The extended state is a collection of the state vectors at the present time k denoted $x(k)$ and the state vectors at the earlier time instances k–1, k–2, . . . , k–L. The last state vector in the estimate of the extended state vector is by definition the fixed delay estimate of the state vector $x(k)$. The fixed delay smoother equations are implemented by vector multipliers 72*ab–z*, smoothed vector summers 74*ab–z*, and the smoother delays 78*ab*-(z–1) where z is equal to the smoother fixed delay L. The estimates $\hat{x}_i(k+1/k+1)$, for i=1, 2 . . . , L appearing in the fixed delay smoother equations are the smoothed state estimate signals 76*ab–z*.

The gain vectors $K_i(k+1)$ appearing in the fixed delay smoother equations are computed in a recursive manner by the gain and covariance equations implemented within the smoothing processor 68. The gain vector $K_0(k+1)$ is computed by the gain and covariance equations and communicated as the 0th gain vector communicated to the phase lock loop 14.

$$P_{i0}(k/j)=E\{\tilde{x}(k-i/j)\tilde{x}^T(k/j)\}$$

$$K_i(k+1)=\hat{A}(k+1)P_{i0}(k+1/k)lS^{-1}(k+1); \ 0\leq i\leq L$$

$$P_{i0}(k+1/k+1)=P_{i0}(k+1/k)-P_{10}(k+1/k)(\hat{A}(k+1)l)(\hat{A}(k+1)l)^TP_{00}(k+1/k)S^{-1}(k+1)$$

$$P_{i0}(k+1/k)=P_{i-1,0}(k/k)F; \ 0\leq i\leq L$$

$$S(k+1)=\hat{A}(k+1)l^TP_{00}(k+1/k)l\hat{A}(k+1)+R$$

$$P_{ii}(k+1/k+1)=P_{ii}(k+1/k)-P_{i0}(k+1/k)\hat{A}(k+1)lS^{-1}(k+1)(\hat{A}(k+1)l)^TP_{i0}^T(k+1/k)$$

$$P_{ii}(k+1/k)=P_{i-1,i-1}(k/k)$$

$$P_{ii}(k/j)=E\{\tilde{x}(k-i/j)\tilde{x}^T(k-i/j)\}$$

Gain and Covariance Equations

In the gain and covariance equations, $P_{ii}$ is a smoother error covariance matrix and provides the smoother estimation error variance. For adaptive smoothing, the estimate $\hat{A}(k)$ of the unknown scintillation amplitude $A(k)$ is provided by the scintillation amplitude estimator 16. The signal amplitude A and the noise variance $\sigma_v^2$ can be related to a carrier noise ratio of the received carrier power P to the noise power spectral density No at the input to the GPS receiver by a carrier noise ratio (CNR) equivalence equation.

Carrier Noise Ratio Equivalence Equation $$CNR = \left(\frac{P}{N_0}\right) = \frac{A^2}{2\sigma_v^2 T}$$

To illustrate the impact of amplitude scintillation on the performance and consequent improvement resulting from the adaptive smoother, simulation results are presented for two different fading models. In these two fading models, phase scintillation is ignored as it can be processed by conventional multistage phase estimation. In the first fading model, the normalized fading signal amplitude $A_{nor}(k)$, defined as the fading signal amplitude of the input signal 10 normalized by the signal amplitude in the absence of fading, is modeled by a sinusoidal amplitude model equation.

$A_{nor}(k)=1+a \sin(2\pi k/N)$  Sinusoidal Amplitude Model Equation

In the first fading model, a=0 corresponds to no fading with a value of the parameter "a" in the interval of (0,1) to specify the fade depth. The closer the parameter a is to one, the higher is the fade depth. The peak-to-peak fade is actually given by 20 log((1+a)/(1−a)). The parameter N, on the other hand, specifies the fade rate relative to the sampling period that is the fade period equaling NT. Thus, the first fading model retains the two important characteristics of the fading channels without going in to any detailed model complexities. More precise ionospheric scintillation fading models can be used. The performance results for a CNR of 37 dB-Hz are summarized in a phase error variance table. A sampling rate of 100 Hz is used in the simulations corresponding to the sampling period T equal to 0.01 seconds. The value for the ratio ($\sigma_a^2/\sigma_v^2$) was selected equal to $10^4$ and corresponds to a loop bandwidth of about 6.0 Hz for the phase lock loop 14 in the absence of any fading. These are typical parameters in a GPS system.

| | | Phase Error Variance ($rad^2$) Table | | |
|---|---|---|---|---|
| a | Fade Depth | No Fading | With Fading | Adaptive Loop Filter | Adaptive Smoother |
| 0.7 | 10.5 dB | 1.32e-3 | .0035 (−4.3 dB) | .0026 (1.35 dB) | 7.5e-4 (6.65 dB) |
| 0.9 | 20 dB | 1.32e-3 | .0095 (−8.6 dB) | .0052 (2.6 dB) | .0015 (8.0 dB) |

In the phase error variance table, the dB values with fading denote the degradation due to fading, while the adaptive loop filter and adaptive smoother show improvement in dB. As may be inferred from the phase error variance table, for the case of a=0.9, there is a degradation of 8.6 dB due to fading. The adaptive smoother provides an improvement of about 8.0 dB and almost completely offsets the degradation due to fading. For the case of a=0.7, the adaptive smoother more than compensates for the fading loss.

The second fading model considers the fading channel modeled by a Rayleigh distributed fading envelope with a specified fading bandwidth for the fade envelope. The range of the fading bandwidth is arrived at by a detailed analysis of the ionospheric scintillation phenomenon. In reference to ionospheric amplitude scintillation, Rayleigh fading corresponds to the most severe fading. Simulations show that for the second fading model with the scintillation amplitude estimator 16 having type II amplitude tracking filter 60, the estimator 16 closely tracks the actual signal amplitude of the input signal 10. The phase error variance with the adaptive smoother provides an improvement of 6–7 dB over the 3.0 dB fading bandwidth in the range of 0.1 Hz to 8.0 Hz for the second fading model.

The adaptive smoother combats performance loss arising due to signal fading. For carrier tracking in a GPS receiver, the simulation examples show that under Rayleigh fading conditions representing strong scintillation, there is a performance degradation of about 6–7 dB due to amplitude scintillation. The actual degradation depends upon the loop noise bandwidth, the dynamics and phase noise involved and the loop filter design and will be applicable to both the carrier and code tracking loop. Simulation results show that the degradation is inversely related to the channel fading bandwidth having smaller bandwidth with smaller fade rate and with higher degradation. The simulation results also show that the scintillation amplitude estimator 16 tracks the envelope of the fading signal with relatively small error. With the knowledge of the received signal amplitude, the loop filter 14 can be optimized in real time to minimize the phase estimation error variance and the the loop 14 is designed on the basis of Kalman filtering. Such a gain adaptation of the loop 14 can provide an improvement of about 1–2 dB in tracking error. The adaptive smoother that combines fixed delay smoother with scintillation amplitude estimations provides an improvement of about 6–7 dB in the simulation examples for the scintillation first and second exemplar fading models. Thus, for most fading situations, the adaptive smoother is capable of offsetting any performance due to amplitude scintillation. Necessarily, if there is no fading, the adaptive smoother still provides about 6.0 dB improvement of tracking accuracy. Because the smoother delay is a small fraction of one second, the delay caused by fixed delay smoother 18 can be offset in most GPS applications by a navigation prediction estimated over the delay interval on the basis of velocity estimate in the navigation solution.

The preferred embodiment is described with respect to carrier phase estimation. However, a similar embodiment can be described for code delay tracking, wherein, the phase lock loop of the preferred embodiment is replaced by an early-late code tracking delay lock loop (DLL) and the unbiased sampled amplitude estimate is equal to the prompt correlated output of the DLL. Moreover, when adaptive smoother is applied to both phase and delay tracking, the signal amplitude estimator 16 can be shared with the code delay tracking smoother. Those skilled in the art can make enhancements, improvements, and modifications to the invention, and these enhancements, improvements, and modifications may nonetheless fall within the spirit and scope of the following claims.

What is claimed is:

1. A system for providing a final smoothed phase estimate of a phase between an input and a reference, the input having a dynamic phase process and a time varying amplitude, the system comprising, a phase lock loop for receiving the input, for generating the reference, for generating an inphase prediction error of the phase between the input and the reference, for generating a filtered state estimate for adjusting the reference, for adjusting the filtered state estimate in response to the time varying amplitude, and for adjusting the reference to reduce the inphase prediction error in the presence of the time varying amplitude and the dynamic phase process, an amplitude estimator for receiving the reference, for receiving the inphase prediction error, for receiving the input, for generating a quadrature prediction error of the phase between the input and the reference, for generating a time varying amplitude estimate from the inphase prediction error and quadrature predictor error, and for generating a final amplitude estimate from the time varying amplitude estimate, and a fixed delay smoother for receiving inphase prediction error, for generating the final smoothed phase estimate from the filtered state estimate and from the final amplitude estimate, the final smoothed phase estimate being delayed from the input by a fixed delay.

2. The system of claim 1 wherein the fixed delay smoother is further for generating a plurality of gain vectors from the final amplitude estimate, one of the plurality of gain vectors adjusting the inphase prediction error for adjusting the filtered state estimate.

3. The system of claim 1 wherein the fixed delay smoother is further for generating a zero to L plurality of gain vectors from the final amplitude estimate, the 0th one of the plurality of gain vectors adjusts the inphase prediction error for generating a 0th smoothed state estimate in the phase lock loop for adjusting the filtered state estimate, the fixed delay smoother adjusting the inphase prediction error by the one to L remaining ones of the plurality of gain vectors for respectively generating a respective plurality of one to L smoothed state estimates, the fixed delay smoother extracting the final smoothed phase estimate from the zero to L smoothed state estimates.

4. The system of claim 3 wherein, the phase lock loop is further adjusting the inphase prediction error by the 0th one of the plurality of gain vectors for providing a 0th correction vector, the phase lock loop generating a state prediction vector from a dynamic phase function applied to the filtered state estimate, the state prediction vector being summed with the 0th correction vector for providing a 0th smoothed state estimate delayed for generating the filtered state estimate, and the fixed delay smoother adjusts the inphase prediction error by the plurality of one to L remaining ones of the plurality of gain vectors for providing a respective plurality of one to L correction vectors with each one of zero to L correction vectors cumulatively respectively summed with the state vector and with the one to L minus one correction vectors and respectively delayed for recursively providing a one to L minus one plurality of delayed smoothed state estimates with the (L minus one)th one of the one to L minus one plurality of delayed smoothed state estimates and the Lth correction vector summed into an Lth smoothed state estimate for generating the final smoothed phase estimate.

5. The system of claim 4 wherein the dynamic phase function models the dynamic phase process.

6. The system of claim 1 wherein, the reference is a pseudo random code, the input comprises a carrier modulated by the pseudo random code, the phase is a code phase delay between the pseudo random code and the input, the phase lock loop is an early-late code tracking loop, and time-varying amplitude estimate is a prompt output of the early-late code tracking loop.

7. A system for providing a final smoothed phase estimate of a phase between an input and a reference, the input having a dynamic phase process and a time varying amplitude, the system comprising, a phase lock loop for receiving the input, for generating the reference, for generating an inphase prediction error of the phase between the input and the reference, for generating a filtered state estimate for adjusting the reference, for adjusting the filtered state estimate in response to the time varying amplitude and the dynamic phase process, and for adjusting the reference to reduce the inphase prediction error in the presence of the time varying amplitude and the dynamic phase process, for adjusting the inphase prediction error by a 0th one of a zero to L plurality of gain vectors for providing a 0th correction vector, for generating a state prediction vector from a dynamic phase function applied to the filtered state estimate, and for summing state prediction vector with the 0th correction vector for providing a 0th smoothed state estimate delayed for generating the filtered state estimate, an amplitude estimator for receiving the reference, for receiving the inphase prediction error, for receiving the input, for generating a quadrature prediction error of the phase between the input and the reference, for generating a time varying amplitude estimate from the inphase prediction error and quadrature predictor error, and for generating a final amplitude estimate from the time varying amplitude estimate, and a fixed delay smoother for receiving inphase prediction error, for generating the final smoothed phase estimate from the filtered state estimate and from the final amplitude estimate with the final smoothed phase estimate being delayed in time by a fixed delay from the input, for generating the zero to L plurality of gain vectors from the final amplitude estimate, for adjusting the inphase prediction error by the one to L remaining ones of the plurality of gain vectors for respectively generating a respective plurality of one to L smoothed state estimates, for extracting the final smoothed phase estimate from the 0–L smoothed state estimates, for adjusting the inphase prediction error by the plurality of one to L remaining ones of the plurality of gain vectors for providing a respective plurality of one to L correction vectors with each one of zero to L correction vectors being cumulatively respectively summed with the state vector and with the one to L minus one correction vectors and respectively delayed for recursively providing a one to L minus one plurality of delayed smoothed state estimates, and for summing the (L minus one)th one of the one to L minus one plurality of delayed smoothed state estimates with the Lth correction vector into an Lth smoothed state estimate for generating the final smoothed phase estimate.

8. The system of claim 7 wherein the phase lock loop comprises, a controlled oscillator for providing the reference, an inphase mixer for down converting the input into an inphase baseband signal, an inphase sampler-filter for filtering and sampling the inphase baseband signal into the inphase prediction error, and a loop filter, the loop filter comprising:
  (a) a multiplier for adjusting the inphase prediction error into the 0th correction vector;
  (b) a summer for summing the 0th correction vector with the state prediction vector for generating the 0th smoothed state estimate;

(c) a 0th delay for delaying the 0th smoothed state estimate into the filtered state estimate;

(d) an F matrix for applying the dynamic phase function to the filtered state estimate for generating the state prediction vector; and (e) a vector component selector for selecting a first component of the filtered state estimate for providing an error correction to the controlled oscillator for adjusting the reference.

9. The system of claim 8 wherein the 0th gain vector is a Kalman gain vector.

10. The system of claim 7 wherein the amplitude estimator comprises, a quadrature mixer for down converting the input into a quadrature baseband signal, a quadrature sampler-filter for sampling and filtering the quadrature baseband signal into the quadrature prediction error, an inphase squarer for providing an inphase amplitude component from the inphase prediction error, a quadrature squarer for providing a quadrature amplitude component form the quadrature prediction error, a summer for summing the inphase amplitude component with the quadrature amplitude component and with a noise variance for providing the time varying amplitude estimate, and an amplitude tracking filter, the amplitude tracking filter comprises:

(a) a subtractor for subtracting the final amplitude estimate from the time varying amplitude estimate for generating an amplitude error;

(b) a tracking filter for providing a filtered amplitude estimate from the amplitude error; and (c) a tracking integrator for integrating the filtered amplitude estimate into the final amplitude estimate.

11. The system of claim 10 wherein the amplitude tracking filter is a type greater than or equal to type II.

12. The system of claim 7 wherein the fixed delay smoother comprises, a smoothing processor for receiving the final amplitude estimate and for generating the zero to L plurality of gain vectors from the final amplitude estimate, a plurality of one to L minus one delays for respectively delaying the one to L minus one smoothed state estimates into the one to L minus one delayed smoothed state estimates, a plurality of one to L summers for cumulatively respectively summing the zero to L correction vectors for generating the one to L minus one delayed smooth phase estimates and for generating the Lth smoothed state estimate, and a phase component selector for selecting the first component of the Lth smoothed state estimate as the final smoothed phase estimate.

13. The system of claim 12 wherein the smoothing processor is a Kalman filter operating on an extended state vector derived from an extended state vector model for smoothing of the smoothed phase output.

14. The system of claim 7 wherein the input is a code and data demodulated carrier signal.

15. An adaptive smoother for use in a receiver for tracking a communication signal having code and data signals modulating a carrier signal into the communication signal, the receiver demodulating the communication signal into an input having a dynamic phase process and a time varying amplitude, the adaptive smoother for generating a final smoothed phase estimate form the input, the adaptive smoother comprising, a phase lock loop for receiving the input, for generating the reference, for generating an inphase prediction error of the phase between the input and the reference, for generating a filtered state estimate for adjusting the reference, for adjusting the filtered state estimate in response to the time varying amplitude and the dynamic phase process, and for adjusting the reference to reduce the inphase prediction error in the presence of the time varying amplitude and the dynamic phase process, an amplitude estimator for receiving the reference, for receiving the inphase prediction error, for receiving the input, for generating a quadrature prediction error of the phase between the input and the reference, for generating a time varying amplitude estimate from the inphase prediction error and quadrature predictor error, and for generating a final amplitude estimate from the time varying amplitude estimate, and a fixed delay smoother for receiving inphase prediction error, for generating the final smoothed phase estimate from the filtered state estimate and from the final amplitude estimate, the final smoothed phase estimate being delayed by a fixed delay from the input.

* * * * *